US008893301B2

(12) United States Patent
Coronel et al.

(10) Patent No.: US 8,893,301 B2
(45) Date of Patent: *Nov. 18, 2014

(54) METHOD, SYSTEM, AND DEVICE FOR PROVIDING A MARKET FOR DIGITAL GOODS

(71) Applicants: Jack Bertram Coronel, Las Vegas, NV (US); Joseph R Coronel, Las Vegas, NV (US)

(72) Inventors: Jack Bertram Coronel, Las Vegas, NV (US); Joseph R Coronel, Las Vegas, NV (US)

(73) Assignee: JRC Holdings, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,100

(22) Filed: Jan. 13, 2014

(65) Prior Publication Data

US 2014/0283129 A1    Sep. 18, 2014

Related U.S. Application Data

(63) Continuation-in-part of application No. 13/844,971, filed on Mar. 16, 2013, now Pat. No. 8,631,505.

(51) Int. Cl.
*H04L 29/06* (2006.01)
*G06F 21/10* (2013.01)

(52) U.S. Cl.
CPC ........... *G06F 21/10* (2013.01); *H04L 2209/603* (2013.01)
USPC ......................................................... 726/28

(58) Field of Classification Search
None
See application file for complete search history.

(56) References Cited

U.S. PATENT DOCUMENTS

| 5,598,470 | A  | 1/1997 | Cooper et al. |
| 5,757,908 | A  | 5/1998 | Cooper et al. |
| 7,024,393 | B1 | 4/2006 | Peinado et al. |
| 7,228,437 | B2 | 6/2007 | Geisler et al. |
| 7,249,107 | B2 | 7/2007 | Yaacovi |
| 7,346,580 | B2 | 3/2008 | Lisanke et al. |
| 7,383,228 | B2 | 6/2008 | Lisanke et al. |

(Continued)

FOREIGN PATENT DOCUMENTS

WO    WO 2013/103568 A1    7/2013

OTHER PUBLICATIONS

Digital Entertainment Content Ecosystem (DECE) LLC, Ultraviolet Help & FAQs found at http://www.uvvu.com/faqs.php, first published online Dec. 15, 2011 in the US.

(Continued)

*Primary Examiner* — Gilberto Barron
*Assistant Examiner* — David Le
(74) *Attorney, Agent, or Firm* — Robert Ryan Morishita; Morishita Law Firm, LLC (57) ABSTRACT

A system includes one or more processors and computer-readable storage media storing instructions executable by a processor to storing a digital good in a cloud data store that is accessible by a user devices associated with a first user and a second user through their respective accounts. When a request to transfer the access rights to the digital good from the account of the first user to the account of a second user, the transfer of the access rights to the digital good is authorized based on satisfaction of one or more business rules and the access rights are transferred from the account of the first user to the account of the second user while said digital good remains in said cloud data store. The access rights are deleted from the account of the first user.

3 Claims, 5 Drawing Sheets

(56) References Cited

U.S. PATENT DOCUMENTS

| | | |
|---|---|---|
| 7,415,439 B2 | 8/2008 | Kontio et al. |
| 7,421,411 B2 | 9/2008 | Kontio et al. |
| 7,441,037 B2 | 10/2008 | Saxena |
| 7,444,413 B2 | 10/2008 | Saxena |
| 7,594,275 B2 | 9/2009 | Gu et al. |
| 7,769,641 B2 | 8/2010 | Jouret et al. |
| 7,818,811 B2 | 10/2010 | Jain et al. |
| 7,962,413 B2 | 6/2011 | Lisanke et al. |
| 7,978,848 B2 | 7/2011 | Feng et al. |
| 8,117,274 B2 | 2/2012 | Schilders |
| 8,325,920 B2 | 12/2012 | Rassool et al. |
| 8,359,246 B2 | 1/2013 | Buchheit |
| 8,364,548 B2 | 1/2013 | Jouret et al. |
| 8,364,595 B1 | 1/2013 | Ringewald |
| 8,429,752 B2 | 4/2013 | Nimon et al. |
| 8,463,658 B2 | 6/2013 | Racco |
| 2003/0200313 A1 | 10/2003 | Peterka et al. |
| 2004/0034601 A1 | 2/2004 | Kreuzer |
| 2004/0117490 A1 | 6/2004 | Peterka et al. |
| 2004/0267388 A1 | 12/2004 | Perdon |
| 2005/0187879 A1 | 8/2005 | Barrett et al. |
| 2007/0005503 A1 | 1/2007 | Engstrom et al. |
| 2007/0055631 A1 | 3/2007 | Li |
| 2007/0106805 A1 | 5/2007 | Marples et al. |
| 2007/0112678 A1 | 5/2007 | Himelfarb |
| 2007/0204011 A1 | 8/2007 | Shaver et al. |
| 2008/0047006 A1 | 2/2008 | Jeong et al. |
| 2009/0012805 A1 | 1/2009 | Schnell et al. |
| 2009/0165101 A1 | 6/2009 | Peterka et al. |
| 2009/0193526 A1 | 7/2009 | Sweazey |
| 2011/0016182 A1 | 1/2011 | Harris |
| 2011/0106917 A1 | 5/2011 | Park et al. |
| 2011/0302009 A1 | 12/2011 | Freed |
| 2011/0314560 A1 | 12/2011 | Harris |
| 2012/0041829 A1* | 2/2012 | Rothschild et al. .......... 705/26.1 |
| 2012/0173625 A1 | 7/2012 | Berger |
| 2013/0060615 A1 | 3/2013 | Block et al. |
| 2013/0060616 A1 | 3/2013 | Block et al. |
| 2013/0060661 A1 | 3/2013 | Block et al. |
| 2013/0060700 A1 | 3/2013 | Rassool et al. |
| 2013/0173912 A1 | 7/2013 | Cui et al. |

OTHER PUBLICATIONS

Jim Taylor, Ultraviolet Demystified Ultraviolet Frequently Asked Questions (and Answers) found at http://www.uvdemystified.com/uvfaq.html, first published online Apr. 16, 2011 in the US.

* cited by examiner

METHOD, SYSTEM, AND DEVICE FOR PROVIDING A MARKET FOR DIGITAL GOODS

RELATED APPLICATION DATA

The present application is a continuation-in-part of U.S. patent application Ser. No. 13/844,971, entitled "Method, System, and Device for Providing a Market for Digital Goods," filed Mar. 16, 2013 by Applicants herein, and issued as U.S. Pat. No. 8,631,505 on Jan. 14, 2014.

FIELD OF THE INVENTION

The present invention relates to systems, devices, and methods for providing access to digital goods. More specifically, the present invention includes systems, devices, and methods for transferring access rights to digital goods without duplicating or transferring the digital good.

BACKGROUND OF THE INVENTION

Digital goods, also referred to as digital content, includes images, electronic books "e-books," audio recordings, video recordings, computer applications, and other forms of information transferable over a communication network such as the internet.

As described in U.S. Pat. No. 8,364,595, the disclosure of which is incorporated herein by this reference, transfers of digital goods between users, as well as content providers and users, may take many different forms including a sale, a rental, a gift, a loan, a trade, etc. The problem identified in U.S. Pat. No. 8,364,595 is that copies of digital goods are easy and inexpensive to make, which can lead to repeated transferring of a digital good without the right to use the digital good. That is, users copy and distribute digital goods without the legal right to copy and distribute and, just as importantly, the recipients of the copies lack the legal right to use the copies.

As stated in U.S. Pat. No. 8,364,595, a secondary market in digital goods is economically efficient since users may own legitimate copies and transfer that legitimate copy to another user without running afoul of copyright law. The solution presented in U.S. Pat. No. 8,364,595 is to create an electronic marketplace that acts as the "middleman" in any transfer of a digital good. In essence, U.S. Pat. No. 8,364,595 discloses creating a personalized data store or digital locker for each user. Upon receiving a request to transfer a digital good from one user to another, the marketplace transfers the digital good from the transferor's digital store to the transferee's digital store and deleting the digital good from the transferor's digital store.

SUMMARY OF THE INVENTION

The present invention includes a system and computer-readable medium for carrying out a process. In one optional embodiment, a system includes one or more processors and computer-readable storage media encoded with instructions that, when executed on the one or more processors, instruct the one or more processors to perform acts for enabling permissible transfer of access rights to digital goods among different users.

A digital good is obtained from an authorized source and stored in a cloud data store. The cloud data store is accessible by a user device associated with a first user through an account of a first user, a second user through an account of a second user, and so forth. The digital good is a digital good in which the first user has legitimately obtained access rights.

A processor determines that the access rights to the digital good are available for transfer from the account of the first user and an indication is provided that the access rights to the digital good are available for transfer from the account of the first user.

A request to transfer the access rights to the digital good to the account of a second user is received. In response to the request, the transfer of the access rights to the digital good to the account of the second user is authorized based on satisfaction of one or more business rules. Upon authorization of the request to transfer the access rights to the digital good to the account of the second user, the access rights to the digital good are transferred from the account of the first user to the account of the second user while the digital good remains in the cloud data store. The access rights to the digital good are deleted from the account of the first user.

DESCRIPTION

Reference is now made to the figures wherein like parts are referred to by like numerals throughout. As described above, digital goods may include images, e-books, audio recordings, video recordings, computer applications, and any other forms of information transferable over a communication network such as the Internet. A digital good is one which a user has legitimately obtained access rights to, and may permissibly transfer to another user. To avoid issues that arise from creating copies which may interfere with a content producer's rights, it is desirable to facilitate transfer of the rights associated with digital goods from the content producer (primary marketplace) or original user (secondary marketplace) to a subsequent user of a digital good while avoiding problems with respect to copyright infringement, the first sale doctrine, license obligations, and the like. Thus, a primary or secondary market which allows users and content sources to effectively and permissibly transfer access rights to digital goods to others without transferring the digital good or a copy of the digital good is therefore desired. As used herein, it is understood that the digital good is one to which a user or content source possesses transferrable "access rights."

This disclosure describes an electronic marketplace facilitating a primary or secondary market for access rights to digital goods. The electronic marketplace acts as to both provide information regarding the availability of access rights in digital goods as well as transfer access rights in the digital goods. Digital goods are stored in a cloud data store which may be implemented as a non-resident, user-generic storage location of digital goods accessible by one or more devices at one or more locations through one or more networks. Accordingly, the cloud data store may be maintained in storage remote from the devices that access the cloud data store, e.g., a remote database, a network based storage resource such as a cloud storage service, or the like. The cloud data store is common, i.e., shared, among users in that each user may access the cloud data store and the digital goods stored within it, although, as described below, an account may be required to access the cloud data store, i.e., the cloud data store may be publicly accessible, but with conditions and restrictions, such as the requirement of a user account. As described herein, permissible transfer of the access rights associated with a digital good is made in accordance with policies enforced in the marketplace, and may include digital good licensing conditions, legal requirements of the country or jurisdiction to which the marketplace is subject, and so forth.

In various different implementations, digital goods accessible from the cloud data store may be streamed to a user's local computing device or otherwise accessed by a user through a cloud data store interface via one or more devices at one or more locations via one or more networks. As understood in the art, "stream" and "streaming" refer to transfer of a digital good from one storage location or computing device to another storage location or computing device, without storing the digital good at the receiving storage location or computing device after conclusion of the streaming. Streaming can occur in a more or less continuous stream or the stream may be segmented, thereby ensuring that the receiving computing device or storage location does not receive a file that contains the complete stream. In any case, streaming is transitory in nature insofar as the digital good (or a portion thereof) is present in memory of the receiving storage location or computing device only temporarily during the act of streaming.

In one example, a user may use an account interface to access and manage his or her access rights to digital goods in a cloud data store. Because the user does not possess a copy of the digital good in a personal data store, the user is only able to transfer access rights to digital goods from the user's account to the account of another user. An account interface may also allow a user to maintain within his or her account a list of desired access rights (for example, movies the user would like to have access to from the cloud data store), maintain a list of access rights which are available for transfer (for example, movies the user no longer wants to be able to access), or the like. The transfer of the available access rights from a first user's account to a second user's account may be a result of a sale, rental, loan, gift, trade, or the like.

Figure 1:
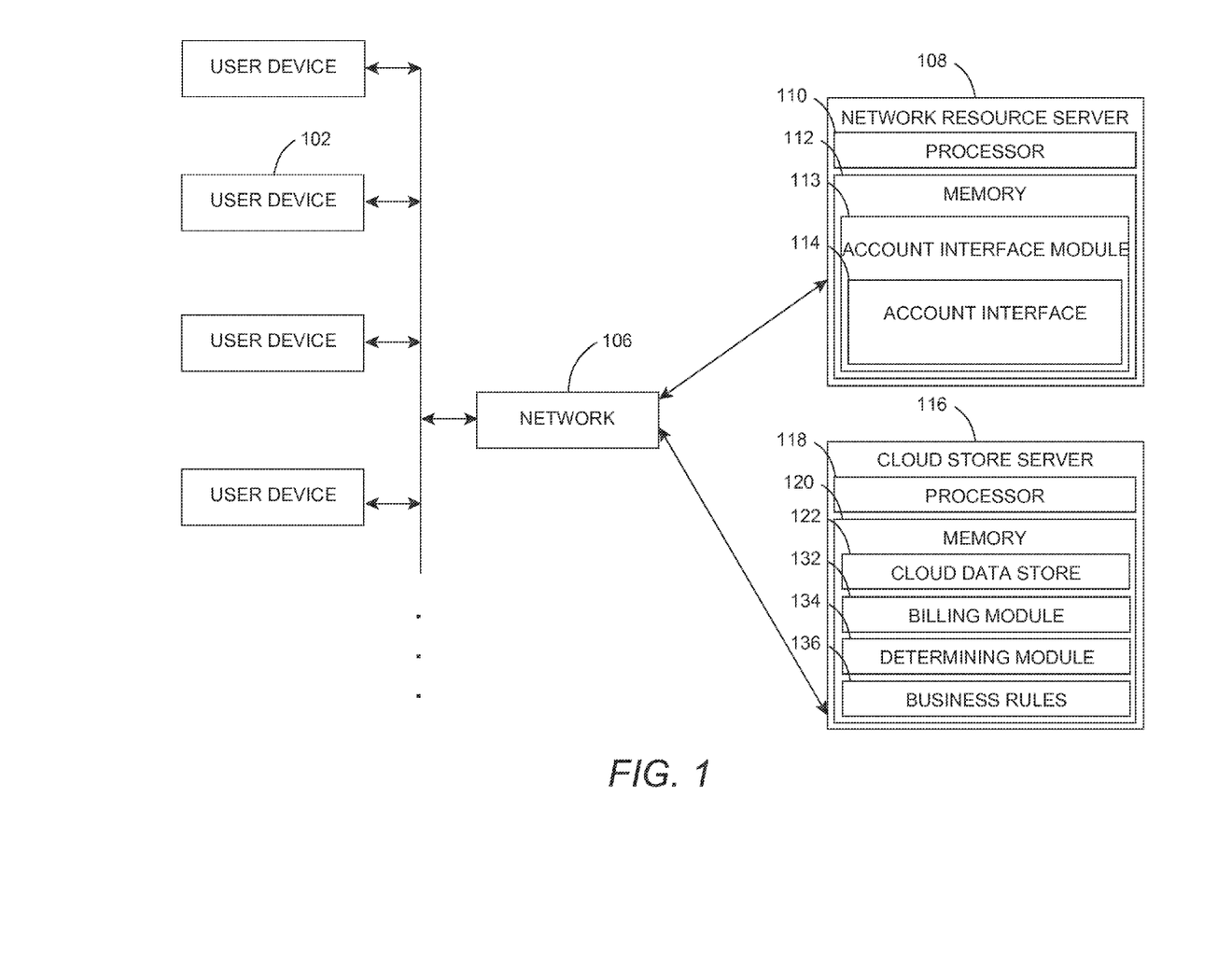
FIG. 1 is a block diagram of a system according to an embodiment of the present invention.

As illustrated in FIG. 1, a system according to an embodiment of the present invention includes user devices 104 to access a network 106 and establish communication with a server 108 implementing a network resource, e.g., a website. It is contemplated that any quantity of user devices 104 may be provided.

A network 106 allows communication between user devices 104 and servers, such as a network resource server 108. A network 106 may be any type of communication network, including the Internet, a local area network ("LAN"), a wide area network ("WAN"), a wireless wide area network, a cable television network, a wireless network, a telephone network, or the like.

User devices 104 may take any form, including a personal computer, entertainment system, PDA, mobile phone, tablet device, e-reader, kiosk, game console, or other computing device that is configured to communicate over a network. A network resource server 108 may be either a single server or a larger collection of servers, such as a data center or multiple data centers. Network resource server 108 may include one or more processors 110 and a memory 112. The memory 112 may take any form of computer-readable storage media including, but not limited to, optical data storage, magnetic data storage, random access memory, read-only memory, electrically erasable programmable read-only memory (EEPROM), flash memory or other solid-state memory, or any other medium which can be used to store information which is accessible to a processor 110. The processor 110 is configured to execute instructions stored in the memory 112.

For example, an account interface module 113 may be stored in memory 112 and executed by the processor 110 to provide an account interface 114 to a user. The account interface 114 provides access functionality to users of an account accessible through the network resource server 108 via a network 106. The cloud data store server 116 may be located on the same or a separate server as the network resource server 108 and may also include either a single server, or a larger collection of servers, such as a data center or multiple data centers. A cloud data store server 116 may include one or more processors 118 and a memory 120, the memory including one or more computer-readable storage media. A processor 118 is configured to execute instructions stored in the memory 120.

In one embodiment, stored within memory 120 is a cloud data store 122 associated with a plurality of user accounts. As shown in the illustrated example, a single cloud data store 122 stores a plurality of digital goods 124. The digital goods are, in an optional embodiment, not stored in the cloud data store 122 by users. Rather, digital goods are stored in the cloud data store 122 by content providers. It is contemplated that multiple users may hold the same access rights from an owner for the same digital good (for example, many people may have rights to view any particular movie), but only a single copy (or a limited number of copies) of the digital good is/are stored in the cloud data store 122 with shared access among all users possessing access rights to the digital good. While the cloud data store 122 is illustrated as a single memory 120, it is contemplated that the cloud data store 122 may be distributed across multiple separate memories residing on the same or different servers or in remote data storage accessible to the cloud data store server.

A user may stream, download, or otherwise access a digital good stored in the cloud data store for which the user has access rights. Access rights to digital goods may also be relinquished, added, terminated, transferred, or moved from one account to another account for a variety of reasons and when permitted. For example, a user may permissibly move access rights to digital good from his or her account to the account of another user of an electronic marketplace. By "move," the present invention contemplates that an actual physical transfer of data may occur or an effective transfer may occur with the creation of access rights in the transferee's account that are substantially equivalent to the access rights in the transferor's account. In the illustrated example, access rights to a digital good may be permissibly moved 130 from a first user's account to a second user's account. Once permissibly moved, the access rights to the digital good may be deleted from the first user's account so that the access rights to the digital good no longer reside in the first user's account and now reside only in the second user's account. Significantly, the digital good is untouched in the cloud data store throughout the move.

In some embodiments, a billing module 132 may be configured to levy a fee upon transfer (e.g., movement, download, and/or streaming) of a digital good. A determining module 134 may be configured to determine whether to permit or deny transfer of the used digital good according to one or more business rules 136.

Figure 2:
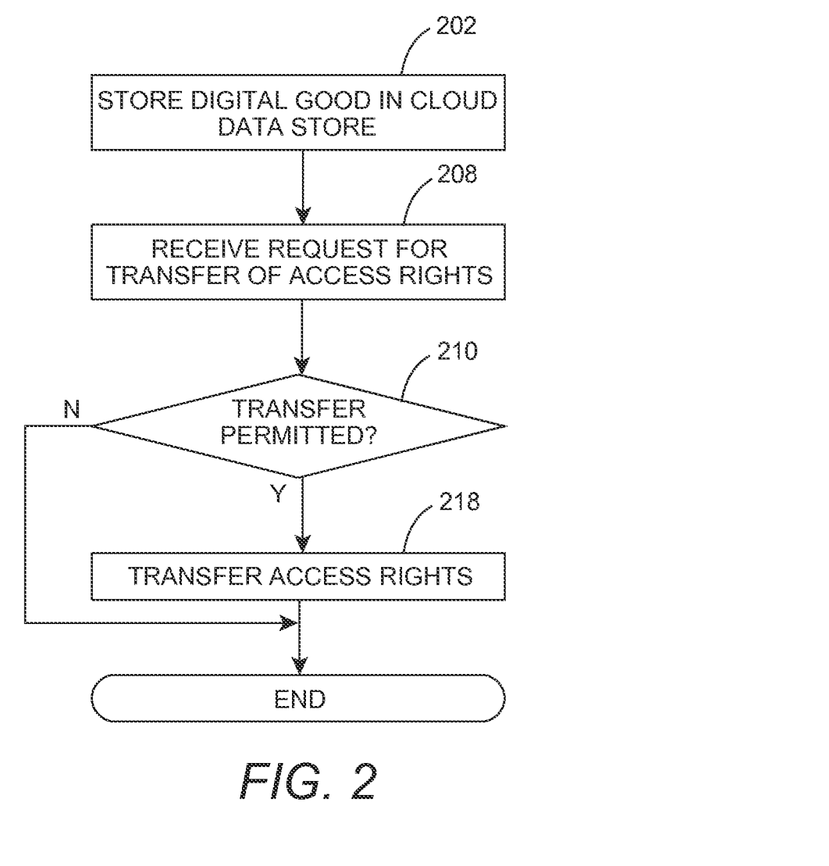
FIG. 2 is a flowchart of a method according to an embodiment of the present invention.

According to an aspect of the present invention, a method for permissibly moving a used digital good to another cloud data store includes receiving 202 a digital good from an authorized source and storing the digital good in a cloud data store. Again, the authorized source may be a content provider (such as a publisher, movie studio, music studio, software producer, game producer, or the like), content distributor (such as a bookseller, movie distributor, music distributor, software distributor, game distributor, or the like), another user with legitimately obtained rights to transfer, a merchant, or another trusted source permitted to distribute access rights to digital goods and/or digital goods themselves to users.

A request for transfer of access rights to a digital good from one user account to another user account is received 208. The network resource server 108, cloud data store server 116, or another server or device acting as a proxy for the cloud data store server 116 may receive the request. Based on various business rules, which may vary from embodiment to embodiment, a determination 210 may be made whether the transfer is permitted. If the transfer is permitted, the access rights are transferred 218 from the originator's account to the recipient's account.

When compensation for a permissible transfer takes place, such as when an originator is selling his or her access rights to a recipient, a credit may be made to an originator account while a corresponding debit (possibly less a transfer fee described next) may be made to the recipient's credit card or other payment account. Similarly, an entity may levy a fee for the transfer instead of, or in addition to, the compensation to the transferor of access rights. The fee may be levied from the transferor, transferee, both, or a third party, such as a content distributor who may choose to pay the transfer fee of digital goods to encourage distribution of digital goods. The entity levying the fee may be the operator of the cloud data store server, owner of the digital good receiving a royalty, or the like.

Figure 3:
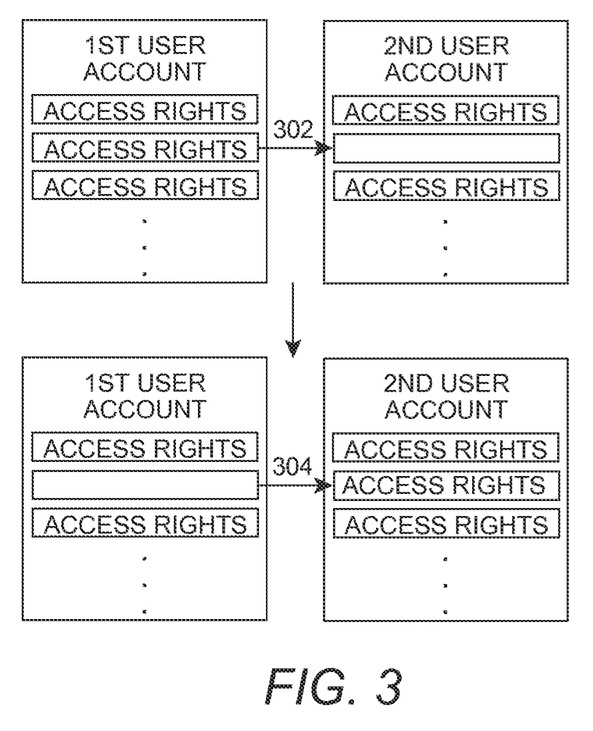
FIG. 3 is a block diagram of a system according to an embodiment of the present invention.

Referring to FIG. 3, access rights to a digital good begin in the account associated with a first user. The first user agrees to make a permissible sale. The operator of the marketplace moves 302 access rights to the digital good to a second user. In the course of the move, access rights to the digital good are removed 304 from the first user's account and access rights which are identical or substantially equivalent to the first user's access rights appear (e.g., are copied, transferred, duplicated, or otherwise written to) the second user's account. The digital good itself remains untouched in the shared cloud data store 122. As a result, the first user is restricted from accessing the digital good at the cloud data store 122 and the second user is allowed to access the digital good at the cloud data store 122. As may be appreciated, the second user may likewise transfer his or her access rights to yet a third user in like fashion.

It is contemplated that digital transfers need not be limited to gifts, sales, or other "permanent" transfers. For example, temporary transfers of access rights, such as loans of digital goods, may be permitted. A loan of access rights may be of indefinite duration, have an expiration date, or some other triggering event which terminates the loan. For example, a library may loan access rights to a digital book to a library patron for a fixed period of time, while a user may loan access rights to a digital book to a friend indefinitely. When a loan expires, access rights to the loaned digital good are removed from the borrower's account, while the digital good remains untouched in the cloud data store. Access rights to the digital good may be restored to the account of the lender, forwarded to another borrower, or terminated. In this regard, it is noted that while it may be desirable to limit the copies of a digital good and therefore limit or prohibit transfers of an actual digital good, the present invention contemplates that the digital good is not copied with each transfer and that access rights to the digital good may be transferred without limit in both a primary market and a secondary market.

As used herein, the phrase primary market includes a market between a content source (such as an owner, distributor, retailer, wholesaler, or the like of digital goods) and a user. As used herein, the phrase secondary market includes a market between users. The present invention may apply to a primary market and/or a secondary market. It is contemplated that as used in a primary market, the transfer of access rights to a digital good may occur from a content source to a user and from a user to a content source. That is, in an optional embodiment, access rights may be transferred from a content source to a user. As noted above, the digital good itself remains in a cloud data store as the access rights are transferred from a content source to a user. At some point, a user may transfer the access rights back to the content source. Again, this would effectively terminate the user's access rights to the digital good while the digital good remains in the cloud data store.

Figure 4:
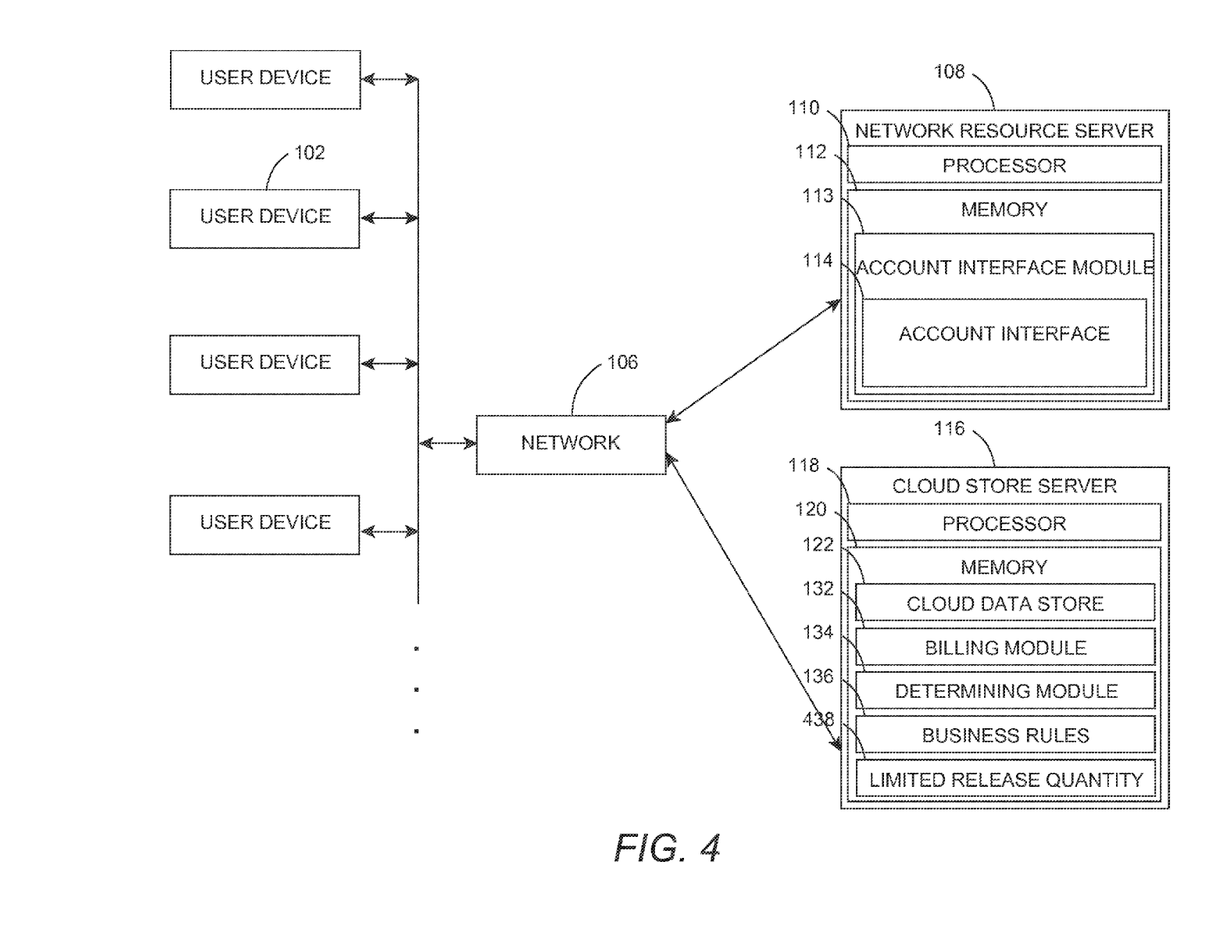
FIG. 4 is a block diagram of a system according to an embodiment of the present invention.

In this manner, a content source could control the volume of access rights for any digital good. For example, as illustrated in FIG. 4, for certain digital goods, a limited release quantity 438 of access rights to digital goods, such as 1,000, could be defined by the authorized content source for transfer to users. In controlling the quantity of access rights, the authorized content source could affect the volume and price associated with the access rights. For example, certain types of digital goods, such as digital artwork, digital tickets, digital admissions, or the like, may benefit from limited release and, thus, may be associated with a limited release quantity. In an example of such an optional embodiment, distribution could be facilitated by a scheduling module to schedule expected availability of a limited access right, reservation module to reserve the right to acquire a limited access right, a waiting list module to indicate interest in acquisition of a limited access right when it becomes available, or the like. The access rights associated with a limited release quantity may function as any other access rights. For example, access rights associated with a limited release quantity may be fully transferrable, so long as the total quantity of access rights in users' accounts does not exceed the limited quantity of access rights available.

Figure 5:
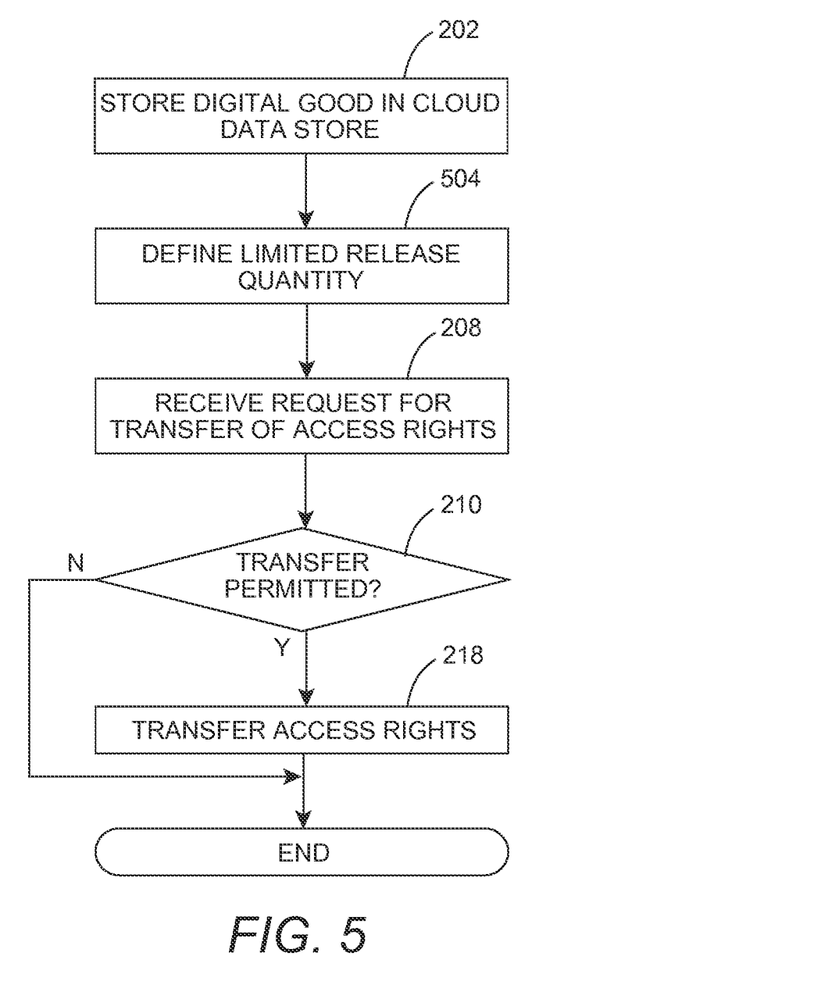
FIG. 5 is a flowchart of a method according to an embodiment of the present invention.

Thus, in one such optional embodiment illustrated in FIG. 5, an authorized source may define 504 a limited quantity of access rights which are available for transfer from the content source to users. Transfers to users from the authorized source may be limited by the limited release quantity. In an optional embodiment, users may be permitted to transfer those access rights to other users. However, in transferring those access rights to other users, the transferring user's access rights are terminated, thereby leaving the total quantity of access rights that have been released to users the same. For example, if a content source defines a limited release quantity of 1,000 access rights to a work, and transfers 872 access rights to users while retaining 128 access rights in "inventory," a user seeking to acquire access rights to the work may obtain a transfer of one of the 128 access rights retained by the content source (thereby decrementing the retained access rights from 128 to 127), or obtain a transfer of one of the 872 access rights held by users (which, after terminating the transferor's access rights, remains at 872 access rights held by users). Thus, regardless of where the transferee user obtains the access rights, the total access rights released will remain fixed at 1,000 total.

In one use of the present invention, access rights to a digital good may be transferred from a content source to a user in exchange for a payment, fee, subscription, or the like. At a future point, the access rights may be transferred back to the content source from the user. This transfer may be automatic, such as upon expiration of a quantity of time, upon a defined use, type of use, quantity of use, or other use-based limitation, or other defined event. Alternatively or additionally, the transfer may be initiated by the user, such as when a user determines he or she no longer wants access rights to the digital good. Again, the transfer of access rights from the user to a content source may include payment, credit, rebate, return, exchange of other access rights, or other value provided by the content source to the user in consideration for the transfer.

In an optional embodiment, the history of transfers between content sources and users and/or transfers between users may be recorded. In an optional embodiment, the recorded history may be associated with the digital good. In one such optional embodiment, the recorded history may include data, such as quantities of access rights transfers and consideration received for each transfer of access rights, which may assist in pricing, statistical analysis, and auditing access rights and/or the use of access rights to a digital good.

In an optional embodiment, access rights may vary in scope, usage, application, or the like. For example, in an optional embodiment, a content source may create or establish varying levels of access rights. In one such optional embodiment, for example, a content source may create access rights that include one or more defined limitations (such as limits on the duration of the access right, usage of the access right, location of the access right, transfer of the access right, or the like). In such an example, differing levels of access rights to a single digital good may be offered. Thus, in one such example, an access right to utilize a digital good for a defined period of time before expiration may differ from an access right to utilize that same digital good without expiration. Similarly, in one such example, an access right to access a digital good (e.g., view, listen, read, or the like) may differ from an access right to utilize that same digital good in creating a derivative work (e.g., use a musical composition, video clip, or the like in a user-created derivative work). In an optional embodiment, access rights may be defined by a content source with selections of different types and/or levels of access rights available to users. In an additional or alternate optional embodiment, access rights may be customizable by users at the users' selection.

In an additional or alternative optional embodiment, access rights may be divided, allocated, or otherwise separated by a content source or a user. For example, the access rights to access a digital good (e.g., view, listen, read, or the like) by a single user or single user device may be separate and distinct from the access rights to access a digital good by multiple users or multiple user devices. In another example, the access right to access a digital good may be separate and distinct from the access right to download a digital good. Similarly, the usage of access rights may be divided, allocated, or otherwise separated by a content source or a user. For example, a non-transferrable access right to access a digital good may be separate and distinct from a transferrable access right to access a digital good.

In an optional embodiment, access rights may apply to multiple digital goods. In one such example, access rights may be granted in groups or sets of digital goods. For example, access rights could be granted in a subscription basis to access multiple digital goods contemporaneously, serially, upon user demand, or in any other manner. In such an optional embodiment, access rights to bundled goods, serial goods, bulk goods, or the like may be created. It is contemplated that the multiple digital goods may be selected by the user and/or selected by a content source (e.g., retailer, distributor, content creator, content owner, or the like).

Access rights in multiple digital goods may also be created or transferred based on the satisfaction of defined conditions. For example, in one optional embodiment, access rights in a digital good may terminate, more or less automatically, and be replaced by access rights in a different digital good. For example, access rights in a preview video may terminate automatically and be replaced by access rights in a feature video. In another example, access rights in one installment of a book, magazine, newspaper, or the like, may terminate automatically and be replaced by access rights in an ensuing installment of a book, magazine, newspaper, or the like. In yet another example, access rights may be added onto or subtracted from existing access rights to the same or a different digital good. For example, upon exercising a first access right to access a digital good, an additional access right in the same or a different digital good may be granted, while leaving the first access right untouched. In a variation on such an optional embodiment, upon exercising a first access right to access a digital good, the first access right may be modified in some manner so that the first access right remains for the user, but in a different form. In any of these cases, i.e., where access rights are replaced, added to, modified, or subtracted from, the access rights may evolve, de-evolve, or morph in any manner.

The usage of access rights may also vary, optionally based on the relationship between parties. For example, in one optional embodiment, discussed in greater detail above, access rights may be transferrable between users. In another example, access rights may be transferrable between user devices, whether or not the user devices are utilized by the same or different users. Similarly, as discussed above, access rights may be transferrable from a user to a content source, e.g., a user may choose to return access rights in a digital good back to the content source. In any such optional embodiments, the transfer may be accompanied by consideration, such as in the form of payment, credit, rebate, return, exchange of other access rights, or other value, or may not be accompanied by any consideration.

In a further optional embodiment, access rights may be accompanied by contractual rights. For example, in an optional embodiment, access rights may be accompanied by a right of first refusal in which access rights must be offered to the party from whom the access rights were acquired, prior to offering the access rights in a secondary market. In another optional embodiment, access rights may be accompanied by a right of reacquisition by the content source, which may take the form of a right of first refusal, but could also take other forms as well. In yet another optional embodiment, access rights may include the right by the content source to "vault" access rights to a digital good under predetermined conditions, such as the distribution of a determined quantity of access rights, or a determined quantity of transfers of access rights, in a digital good.

Among the examples of transfers include transactions in which the access rights of the transferor (e.g., content source, user, or the like) are terminated in favor of access rights of the transferee. For example, when access rights are sold, lent, leased, donated, or the like, the transferor may no longer have access rights to the digital good after the transferee acquires the transferor's access rights. In an additional or alternate example, the transferor may retain access rights to the digital good after sharing the transferor's access rights with a transferee. In another example of coexisting access rights, multiple parties and/or user devices may have independent access rights that are related or unrelated to one another. In yet another example, access rights may be partially transferrable, either at the selection of the transferor or because the access rights of the transferor were created to only be partially transferrable.

As noted above, the present invention may be applied in a primary market or secondary market. In an optional embodiment, transactions on a secondary market may include benefits to third parties not a party to the secondary market transaction. For example, in one such optional embodiment, a content source (such as a content creator) may receive a benefit, such as a share of any consideration received as a result of a transaction between users in which access rights to a digital good created by a content creator are transferred.

While certain embodiments of the present invention have been shown and described it is to be understood that the present invention is subject to many modifications and changes without departing from the spirit and scope of the claims presented herein.

We claim:

1. A system comprising:
   one or more processors; and
   computer-readable storage media encoded with instructions that, when executed on the one or more processors, instruct the one or more processors to perform acts for enabling permissible transfer of access rights to digital goods among different users each having an account stored at a network resource server accessible by user devices associated with said users, the acts comprising:
      storing a digital good obtained from an authorized source in a cloud data store, wherein the digital good in the cloud data store is accessible by a user device associated with a first user through an account of the first user in the form of a stream in which the digital good is accessed by the user device associated with the first user without storing the digital good at the user device associated with the first user and the digital good is present in the user device associated with the first user only temporarily during the act of streaming, wherein the access rights stored in the account of the first user determine the first user's access to the digital good, and wherein the digital good is a digital good in which the first user has legitimately obtained access rights;
      determining that the access rights to the digital good are available for transfer from the account of the first user;
      providing an indication that the access rights to the digital good are available for transfer from the account of the first user;
      receiving a request to transfer the access rights to the digital good to the account of a second user, wherein the digital good in the cloud data store is accessible by a user device associated with the second user through said account of said second user wherein the access rights stored in the account of the second user determine the second user's access to the digital good;
      authorizing transfer of the access rights to the digital good to the account of the second user based on satisfaction of one or more business rules;
      upon authorization of the request to transfer the access rights to the digital good to the account of the second user, exclusively transferring the access rights to the digital good from the account of the first user to the account of the second user while said digital good remains in said cloud data store without transferring the digital good, such that the digital good is accessible by the user device associated with the second user in the form of a stream in which the digital good is accessed by the user device associated with the second user without storing the digital good at the user device associated with the second user and the digital good is present in the user device associated with the second user only temporarily during the act of streaming; and
      deleting the access rights to the digital good from the account of the first user, thereby excluding the account associated with the first user from accessing the digital good.

2. A non-transient, tangible computer-readable storage media encoded with instructions that, when executed on a processor, instruct the processor to perform acts with respect to a digital good associated with access rights, wherein the digital good is stored in a cloud data store separate from the non-transient computer-readable storage media, comprising:
   determining that the access rights to the digital good are available for transfer from an account of a first user at a network resource server accessible by a user device associated with the first user, wherein the digital good is available to the user device associated with the first user in the form of a stream in which the digital good is accessed by the user device associated with the first user without storing the digital good at the user device associated with the first user and the digital good is present in the user device associated with the first user only temporarily during the act of streaming, and wherein the access rights stored in the account of the first user determine the first user's access to the digital good;
   providing an indication that the access rights to the digital good are available for transfer from the account of the first user;
   receiving a request to transfer the access rights to the digital good to an account of a second user at a network resource server accessible by a user device associated with the second user;
   authorizing transfer of the access rights to the digital good to the account of the second user based on satisfaction of one or more business rules;
   upon authorization of the request to transfer the access rights to the digital good to the account of the second user, exclusively transferring the access rights to the digital good from the account of the first user to the account of the second user while said digital good remains in said cloud data store without transferring the digital good, such that the digital good is accessible to the user device associated with the second user in the form of a stream in which the digital good is accessed by the user device associated with the second user without storing the digital good at the user device associated with the second user and the digital good is present in the user device associated with the second user only temporarily during the act of streaming; and
   deleting the access rights to the digital good from the account of the first user, thereby excluding the account associated with the first user from accessing the digital good.

3. A system comprising:
   one or more processors; and
   computer-readable storage media encoded with instructions that, when executed on the one or more processors, instruct the one or more processors to perform acts for enabling permissible transfer of access rights to digital goods from an authorized source to users each associated with an account stored at a network resource server accessible by user devices associated with said users, the acts comprising:

storing a digital good obtained from said authorized source in a cloud data store;

determining that the access rights to the digital good are available for transfer to accounts of users;

providing an indication that the access rights to the digital good are available for transfer to accounts of users;

receiving a request to transfer the access rights to the digital good to the account of a first user, wherein the digital good in the cloud data store is accessible by a user device associated with the first user through an account of the first user, wherein the access rights stored in the account of the first user determine the first user's access to the digital good;

authorizing transfer of the access rights to the digital good to the account of the first user based on satisfaction of one or more business rules, such that the user has legitimately obtained access rights in the digital good from said content source;

upon authorization of the request to transfer the access rights to the digital good to the account of the first user, exclusively transferring the access rights to the digital good from the authorized source to the account of the first user while said digital good remains in said cloud data store without transferring the digital good, such that the digital good is accessible to the user device associated with the first user in the form of a stream in which the digital good is accessed by the user device associated with the first user without storing the digital good at the user device associated with the first user and the digital good is present in the user device associated with the first user only temporarily during the act of streaming;

determining that the access rights to the digital good are available for transfer from the account of the first user;

providing an indication that the access rights to the digital good are available for transfer from the account of the first user;

receiving a request to transfer the access rights to the digital good to the account of a second user, wherein the digital good in the cloud data store is accessible by a user device associated with the second user through said account of said second user wherein the access rights stored in the account of the second user determine the second user's access to the digital good;

authorizing transfer of the access rights to the digital good to the account of the second user based on satisfaction of one or more business rules;

upon authorization of the request to transfer the access rights to the digital good to the account of the second user, exclusively transferring the access rights to the digital good from the account of the first user to the account of the second user while said digital good remains in said cloud data store without transferring the digital good, such that the digital good is accessible by the user device associated with the second user in the form of a stream in which the digital good is accessed by the user device associated with the second user without storing the digital good at the user device associated with the second user and the digital good is present in the user device associated with the second user only temporarily during the act of streaming; and deleting the access rights to the digital good from the account of the first user, thereby excluding the account associated with the first user from accessing the digital good.

\* \* \* \* \*